US007740082B2

(12) United States Patent
Davidson et al.

(10) Patent No.: US 7,740,082 B2
(45) Date of Patent: Jun. 22, 2010

(54) MACHINE FOR REMOVING FERROUS DEBRIS

(76) Inventors: Troy K. Davidson, P.O. Box 317, Shiloh, NJ (US) 08353; Charnell Cassette, 903 Windridge Dr., Stafford, VA (US) 22554

( * ) Notice: Subject to any disclaimer, the term of this patent is extended or adjusted under 35 U.S.C. 154(b) by 0 days.

(21) Appl. No.: 12/073,355

(22) Filed: Mar. 4, 2008

(65) Prior Publication Data

US 2009/0223683 A1 Sep. 10, 2009

(51) Int. Cl.
*A01D 33/00* (2006.01)

(52) U.S. Cl. .......................... 171/18; 89/1.13; 209/228

(58) Field of Classification Search .................. 171/18, 171/111; 89/1.13; 209/213, 218, 225, 226, 209/8, 228

See application file for complete search history.

(56) References Cited

U.S. PATENT DOCUMENTS

| | | | | | |
|---|---|---|---|---|---|
| 2,642,994 | A | * | 6/1953 | Casson | 210/222 |
| 3,057,477 | A | * | 10/1962 | Rappaport | 209/636 |
| 3,432,037 | A | * | 3/1969 | Pixley | 209/223.1 |
| 3,499,564 | A | * | 3/1970 | Hopfeld | 414/614 |
| 3,771,531 | A | * | 11/1973 | Scribner | 460/23 |
| 4,066,537 | A | * | 1/1978 | Bernfeld | 209/223.1 |
| 4,470,747 | A | * | 9/1984 | Tichenor | 414/491 |
| 4,478,152 | A | | 10/1984 | Holley | |
| 4,593,766 | A | | 6/1986 | Gossard | |
| 4,722,283 | A | | 2/1988 | Holley | |
| 4,840,105 | A | | 6/1989 | Ladan et al. | |
| 4,940,001 | A | | 7/1990 | Holley | |
| 5,160,034 | A | | 11/1992 | Potter | |
| 5,291,819 | A | | 3/1994 | Hambric | |
| 5,452,639 | A | * | 9/1995 | Aulenbacher et al. | 89/1.13 |
| 5,706,899 | A | | 1/1998 | Klebanov et al. | |

(Continued)

FOREIGN PATENT DOCUMENTS

| | | |
|---|---|---|
| EP | 183915 | 6/1986 |

OTHER PUBLICATIONS

Website, http://www.ohiomagnetics.com/road_sweep.htm, series of models of magnetic sweepers or cleanup tools and equipment, three sheets printed from the internet on May 10, 2006.

(Continued)

*Primary Examiner*—Thomas B Will
*Assistant Examiner*—Jamie L McGowan
(74) *Attorney, Agent, or Firm*—Richard C. Litman

(57) ABSTRACT

The machine for removing ferrous debris removes such debris from firing ranges where the removal of hard objects is desired to prevent ricochets during firing exercises, particularly on aircraft gunnery ranges. The machine includes a chassis towed behind a remotely controlled or automated vehicle, with a mechanism support frame pivotally mounted on the chassis. A series of magnetic operating arms is provided across the mechanism frame, with a chain drive conveyor cycling the operating arms as the machine is operated. The operating arms automatically release any gathered ferrous debris into a hopper as the arms reach the hopper during their cycle. A mechanism is provided to accommodate angular deflection of the operating arms relative to the hopper due to sloped terrain, and a further automated mechanism is provided to tilt and empty the hopper as required. No human operator is required in the immediate area of the machine.

17 Claims, 9 Drawing Sheets

U.S. PATENT DOCUMENTS

| | | | | |
|---|---|---|---|---|
| 5,731,705 | A | 3/1998 | Guinn | |
| 5,856,629 | A | 1/1999 | Grosch et al. | |
| 6,056,879 | A * | 5/2000 | Schaaf et al. | 210/695 |
| 6,355,176 | B1 * | 3/2002 | Schaaf et al. | 210/695 |
| 6,481,326 | B2 | 11/2002 | French | |
| 6,892,622 | B2 | 5/2005 | Watson | |
| 2003/0226672 | A1 | 12/2003 | Northcutt | |
| 2004/0000227 | A1 | 1/2004 | Einstein | |

OTHER PUBLICATIONS

Website, http://www.hbarber.com/Cleaners/SurfRake/ModelsOptions.aspx, series of machines for litter pickup and cleaning of beaches and other open areas, eight sheets printed from the internet on May 10, 2006.

Website http://www.compaction.com.au/Rammax.htm, remotely operated trench compactor, two sheets printed from the internet on Jun. 6, 2006.

* cited by examiner

MACHINE FOR REMOVING FERROUS DEBRIS

BACKGROUND OF THE INVENTION

1. Field of the Invention

The present invention relates generally to mechanized devices for clearing, leveling, and cultivating land. More particularly, the present invention relates to a machine for removing ferrous debris from fields that is particularly useful for clearing unexploded ordnance or landmines.

2. Description of the Related Art

Gunnery and artillery firing ranges receive a prodigious amount of debris during their use over a long period of time. It is desirable to remove this debris from time to time in order to reduce the potential problem of ricochets from rounds striking the hard ferrous shell fragments deposited earlier on the range. This problem is particularly critical on aircraft gunnery practice ranges, as fired rounds can ricochet from the ground and bounce back up into the path of strafing aircraft.

As a result, it is common practice to clear firing ranges of all hard objects, e.g., stones and the like, and to periodically remove shell fragments and related debris. A number of different means have been used to remove such shell fragments, ranging from manual picking of the fragments, stones, and debris, to mechanized removal of the debris. A problem with such conventional systems is that most require a human operator, or operators, in the immediate vicinity. This has the potential of placing the human operator(s) in harm's way, due to the potential for unexploded ordnance and the possibility of setting off the unexploded ordnance during the removal process. Another problem is that most such systems are only capable of removing debris resting upon the surface, and cannot remove shallowly embedded debris.

A number of automated devices have been developed in the past for clearing mine fields, picking up ferrous metal from construction sites, raking and cleaning sand beaches, etc. Most such devices require a human operator with the machine, or with a prime mover towing or pushing the machine. An example of such a machine is found in European Patent No. 183,915, published on Jun. 11, 1986. This machine is a forward attachment for a utility machine controlled by a human operator in the cab, and comprises a pair of arms having a scoop with a rotary broom disposed in front of the scoop. The device is primarily intended for use upon paved surfaces, such as airport runways and the like.

Thus, a machine for removing ferrous debris solving the aforementioned problems is desired.

SUMMARY OF THE INVENTION

The machine for removing ferrous debris comprises a chassis supported by a single axle and forwardly disposed towing hitch, with a mechanism support frame pivotally mounted to the chassis. A conveyor system comprising two laterally disposed chain drives is installed on the mechanism frame, with the chains supporting a series of operating arms or members therebetween. The operating arms all include scarifiers, with at least some of the operating arms further including magnetic pickups. A series of non-magnetic weights may be used to replace some of the magnets, if desired. A hopper or container for gathering collected debris is also adjustably mounted on the mechanism frame. The operating arms are pivotally suspended from the conveyor crossmembers between the drive chains, and thus hang vertically as the machine is towed over uneven or sloped surfaces. A compensating system is provided to accommodate the arcuate swing of the operating arms relative to the debris collection hopper. The pivotal attachment of the mechanism support frame to the chassis provides height adjustment for the operating arms, as well as accommodation for uneven terrain traversed by the towing vehicle and chassis.

The device is preferably towed by an unmanned, remotely controlled or automated vehicle. The drive system for the operating arm conveyor may be powered from the unmanned towing vehicle, or may alternatively be powered by a power source mounted upon the towed machine. The scarifiers are drawn forwardly through the topsoil as the device is towed across the surface, with the magnetic pickups gathering ferrous debris during the process. The conveyor system comprising the chain drive cyclically rotates the operating arms and their magnetic pickups to a position over the collection hopper, where a mechanism automatically lifts the magnets from the bases of the pickups to release any gathered ferrous debris into the hopper. When the hopper is sufficiently full, the machine may be towed to a suitable dumpsite. A remotely actuated mechanism is provided for tilting the hopper and opening the dump door of the hopper in order to dispense all collected debris. Accordingly, the machine removes ferrous debris on and immediately beneath the surface without requiring the presence of a human operator in the immediate vicinity.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a machine for removing ferrous debris, such as is found distributed over military firing ranges and the like. The machine is completely automated, and does not require the presence of a human operator on board or in the immediate vicinity. This greatly increases the safety of the operator, as the operator is far removed from any potential hazards, such as the inadvertent detonation of unexploded ordnance or mines, etc., which the machine may encounter during operation. The machine itself, and particularly the towed trailer portion that actively removes ferrous debris, is configured to withstand detonations from relatively small ordnance, e.g., 20 mm cannon shells and the like, without incurring any significant or costly damage.

Figure 1:
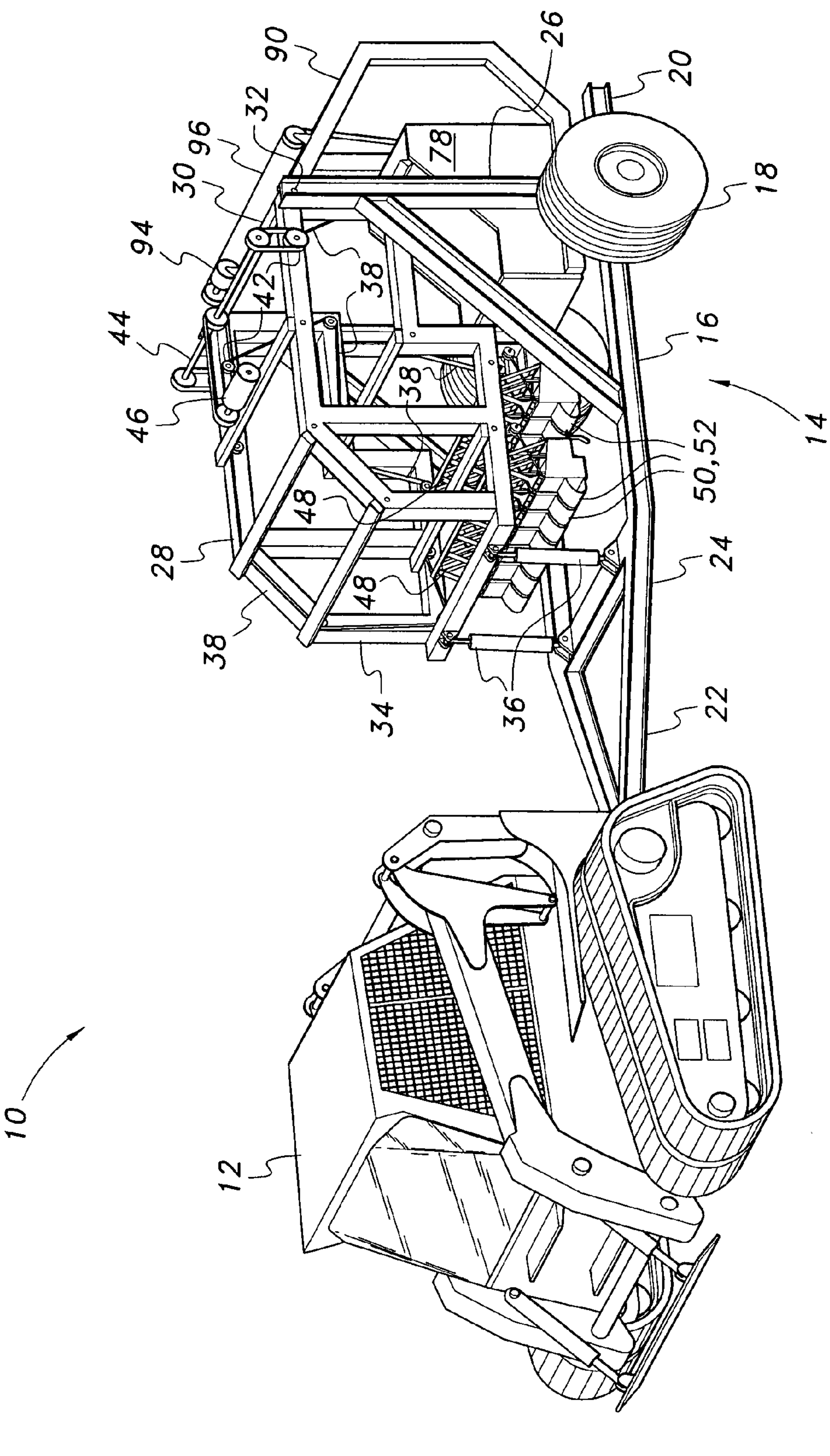
FIG. 1 is a perspective view of a machine for removing ferrous debris according to the present invention, showing the machine in tow behind an unmanned towing vehicle.
Figure 2:
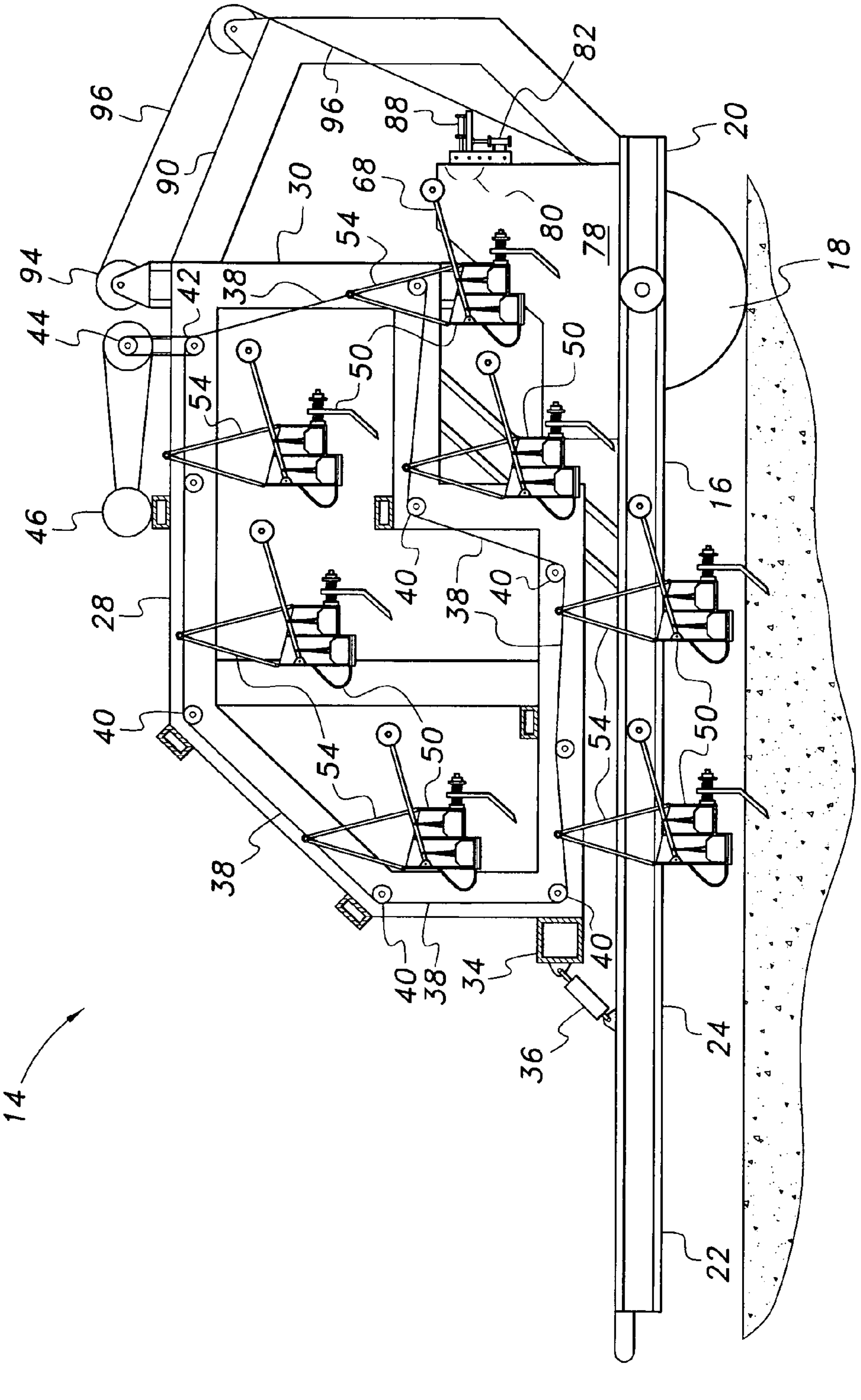
FIG. 2 is a side elevation view in section of the machine of the present invention, showing the path of the drive chain conveyor system for the operating arms and other details.

FIG. 1 provides a perspective view of the overall machine and towing vehicle assembly 10, generally as the assembly would appear in use, with FIG. 2 providing a side elevation view in section of the towed trailer portion of the assembly. The towing vehicle 12 is a remotely controlled or automated machine in order to preclude need for a human operator. The towing vehicle 12 is preferably patterned after a relatively small and lightweight tracked vehicle, such as a commercially available Bobcat® T300 tracked machine or the like. While such machines are configured for operation by a human operator on board, the towing vehicle 12 is modified with appropriate conventional technology (e.g., radio control and/or automated systems) to provide for operation without need for a human operator on board. Such automated or remotely controlled systems are used in such vehicles as the Rammax® RW702 and larger vehicles used for trench compaction, and may be adapted for use with the towing vehicle 12 of the present invention. It should be noted that the illustrated towing vehicle 12 is exemplary, and other alternative towing vehicles may be used with the trailer of the present invention.

The towing vehicle 12 tows a trailer 14 that includes the earth working and ferrous debris gathering components of the invention. The trailer 14 includes a chassis 16 formed of appropriate structural materials, e.g., steel I-beams, channel, etc. The various lengths or sections are preferably welded together for optimum strength. The chassis 16 is supported by opposed wheels 18 near its rearward end 20, and by a tongue 22 extending from its forward end 24.

The rearward end 20 of the chassis 16 includes a pair of opposed uprights 26, to which a mechanism support frame 28 is pivotally attached at the upper ends thereof. The support frame 28 has a rearward end portion 30 secured between the two uprights 26 of the chassis 16 by corresponding pivots 32, and an opposite forward end portion 34 adjacent the forward portion 24 of the chassis 16. At least one, and preferably a pair of, actuator(s) 36 (e.g., hydraulic rams, etc.) are disposed between the forward end 24 of the chassis and the forward end 34 of the mechanism support frame 28. These actuators 36 are used to adjust the relative height and angle of the support frame 28 relative to the chassis 16 to accommodate passage of the vehicle 12 and trailer 14 assembly over rough and uneven terrain while still maintaining the desired engagement with the underlying surface. Hydraulic or other power required for the actuators 36 may be provided by a conventional hydraulic power takeoff from the towing vehicle 12, or from a conventional hydraulic system disposed upon the trailer 14.

The mechanism support frame 28 includes a conveyor system installed thereon for the cyclic carriage of a series of operating arms depending therefrom. The conveyor system comprises a pair of laterally spaced endless chains 38, with one chain positioned immediately inboard of the opposite sides of the mechanism support frame 28. The chains 38 are supported by a series of idler sprockets 40 and driven by a single drive sprocket 42 for each chain. The drive sprockets 42 are, in turn, driven by a cross shaft and transfer chain and sprocket assembly 44, which is driven by a suitable motor 46 (e.g., hydraulic or electric, etc.). The motor 46 may receive its power conventionally from the towing vehicle 12, or from a conventional onboard power source (generator, hydraulic pump, etc.). The cross shaft assembly 44 assures that both chains 38 will remain in synchronization with one another during operation.

Figure 4:
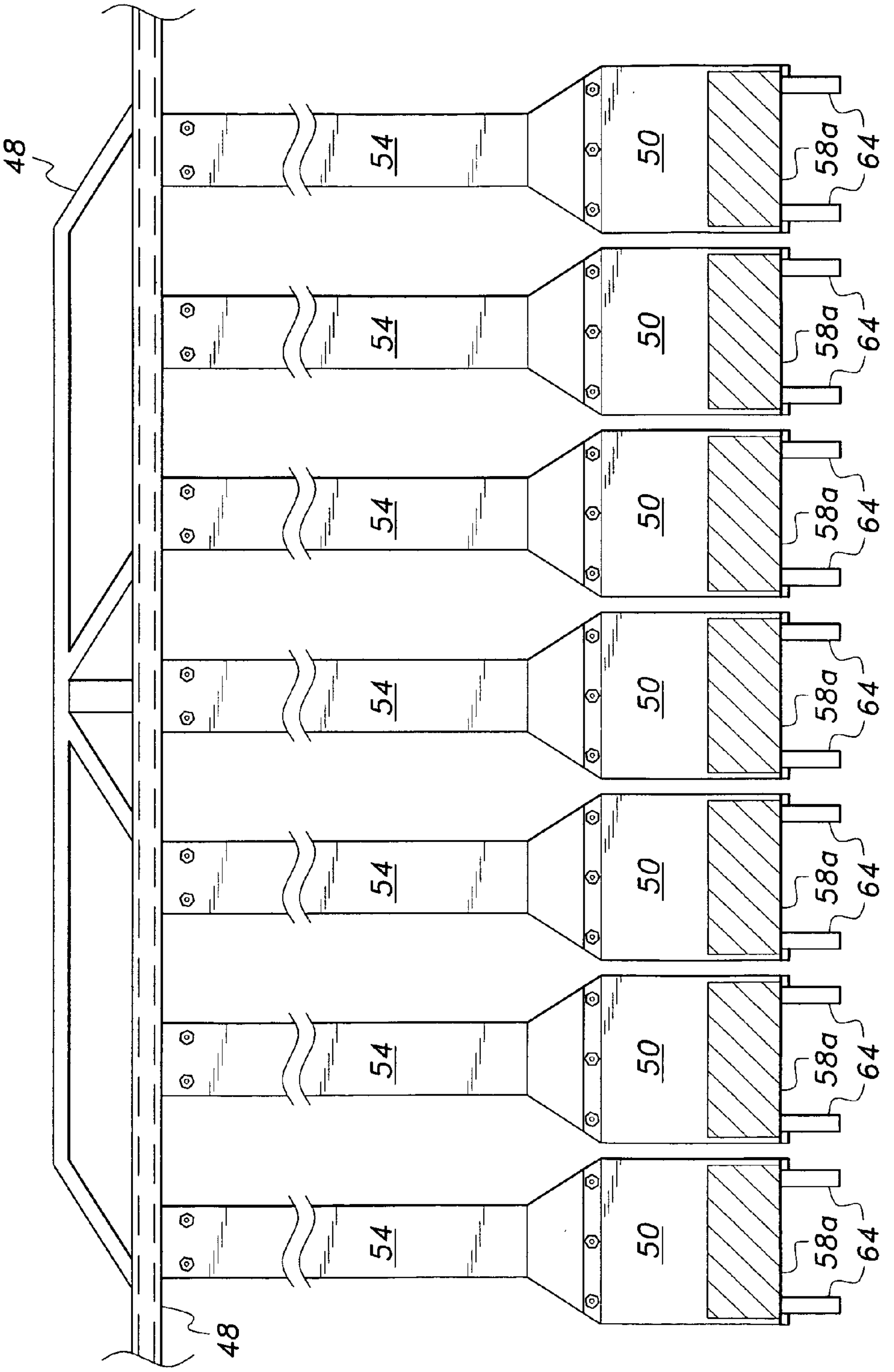
FIG. 4 is a schematic front elevation view of one row of operating arms installed upon a crossmember of a machine for removing ferrous debris according to the present invention, the chain attachment ends of the crossmember being broken away for clarity.

A series of operating arm support crossmembers 48 extend across the mechanism support frame 28 between the two conveyor chains 38. A detail view of one such crossmember 48 is shown in FIG. 4, less the chain connecting ends thereof. The ends of one of the crossmembers 48 are shown in other drawings, i.e., FIGS. 5A, 5B, and 6. Each crossmember 48 supports a series of operating arms 50 and/or 52 therefrom, with the operating arms 50, 52 being pivotally suspended from the crossmembers 48 by a plurality of suspension straps 54. While only two operating arm support crossmembers 48 are shown in FIG. 1 for clarity in the drawing, it will be understood that preferably a larger number of such crossmembers is provided between the two conveyor chains 38, as represented by the seven operating arms 50 shown in the cross-sectional view of FIG. 2. A larger or smaller number of such crossmembers may be provided as desired, up to the limit determined by the size of the machine and the configurations of the conveyor chain run and operating arms.

Figure 3A:
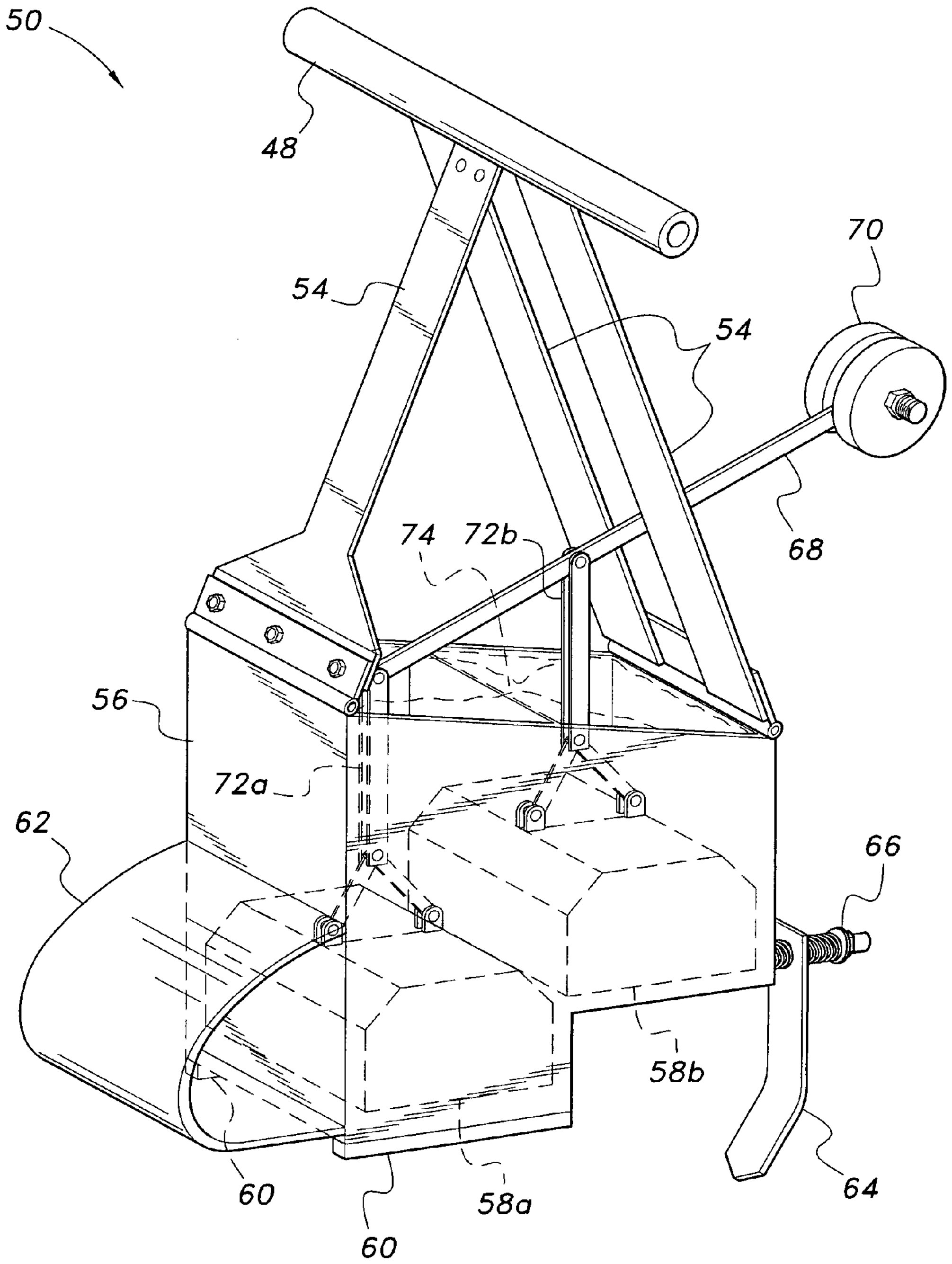
FIG. 3A is a detailed perspective view of one of the magnetic operating arm assemblies of a machine for removing ferrous debris according to the present invention, showing various details thereof.

A first type of operating arm 50, having one or more magnets therein, is shown in detail in FIG. 3A of the drawings. The magnetic operating arm 50 includes a magnet canister 56 suspended from the forward and rearward operating arm suspension straps 54, with at least one magnet adjustably disposed within the canister 56. Preferably, the canister contains a forwardly disposed magnet **58*a* and a rearwardly disposed magnet 58*b*, with the rearward magnet 58*b* stepped up slightly higher than the forward magnet 58*a*. This allows any ferrous debris that is pushed aside by the lower forward portion of the canister 56 to gather beneath the higher rearward magnet 58*b* due to its spacing above the underlying terrain. However, the lower forward portion of the bottom of the housing or canister 56 preferably includes one or more spacers or shoes 60 depending therefrom to space the bottom of the lowest portion of the canister 56 from the underlying terrain. A bumper or deflector 62 may also be provided at the lower front of the canister 56** to reduce the likelihood of the canister snagging upon a solidly embedded object.

At least one scarifying tooth 64 extends from the rearward portion of the canister 56 for engaging and tilling the uppermost layer of soil to loosen any embedded ferrous metal debris. Two such teeth 64 are shown depending from each of the magnetic type operating arms 50 of the assembly of FIG. 4. The magnets of subsequent operating arms 50 disposed along trailing rows of crossmembers 48 will then pick up the ferrous metal objects loosened by the preceding arms 50 or 52 and their scarifying teeth 64. The scarifying teeth 64 are preferably attached to the canisters by a spring mechanism 66 in order to reduce shock and breakage of the teeth 64 upon contacting a hard, immovable object, such as a large stone.

A magnet lifting arm 68 is pivotally attached to the upper forward portion of the canister 56 and extends upwardly and rearwardly therefrom, beyond the upper rear portion of the canister 56. The lifting arm 68 includes a distal cam contact end, which preferably includes a roller 70 thereon to reduce friction and wear when contacting the magnet lift cam, as described in detail further below and shown in FIGS. 5A and 5B. Each of the magnets 58*a*, 58*b* is connected to the overlying magnet lifting arm 68 by an intermediate link, respectively 72*a* and 72*b*. A seal 74 (flexible plasticized fabric boot, etc.), shown in broken lines in FIG. 3A, is preferably installed about the intermediate links 72*a*, 72*b* and over the top of the canister 56 to prevent the entry of dirt and dust into the canister. Thus, as the distal end 70 of the lifting arm 68 is raised, the two magnets 58*a*, 58*b* are also lifted from their positions in the bottom of the canister 56, thereby removing their magnetic fields from the bottom of the canister 56 and releasing any ferrous debris collected thereon. The actuating cam for the lift arm 68 and the ferrous debris collection hopper are shown in detail in FIGS. 5A through 7, and discussed in detail further below.

Figure 3B:
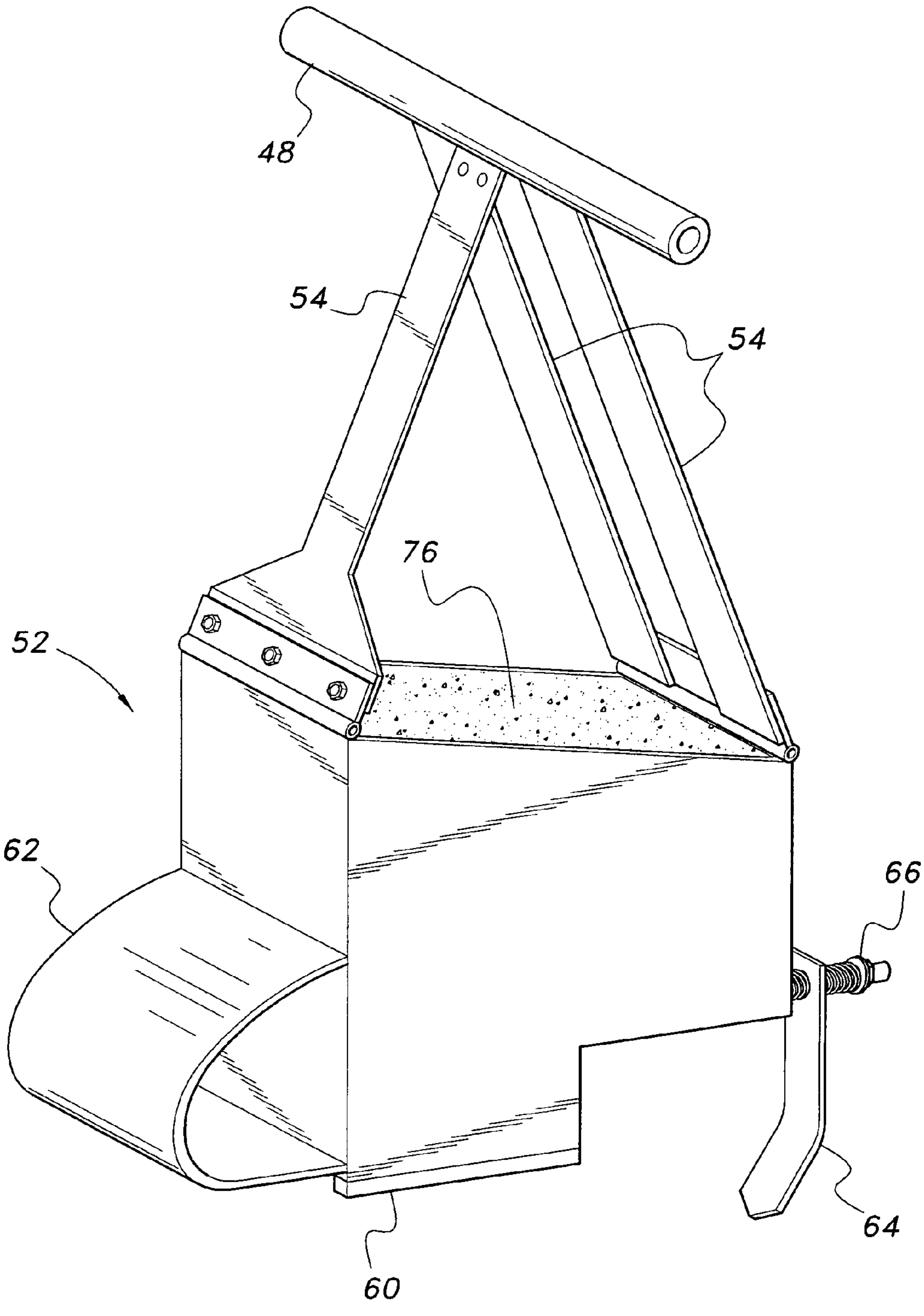
FIG. 3B is a detailed perspective view of an alternative operating arm assembly of a machine for removing ferrous debris according to the present invention, the alternative assembly being weighted with a non-magnetic mass.

In some cases, it may be determined that it is not necessary to equip every operating arm station or position with the magnetic-type operating arms 50. In many cases, it may be reasonably efficient to provide a number of non-magnetic operating arms 52, as shown in detail in FIG. 3B. Such non-magnetic arms 52 need only have sufficient weight to cause the scarifying teeth 64, which are also provided on such non-magnetic operating arms, to engage the underlying soil. The canister of the non-magnetic operating arm 52 may be filled with any suitable massive material 76. Concrete is preferred, as it is relatively inexpensive. However, other materials may be used as desired, e.g., stones, heavy metals (such as lead), etc. The loosening of any embedded ferrous debris by the scarifying teeth 64 of the non-magnetic operating arms 52 results in the ferrous debris being picked up by the following magnetic operating arm(s) 50.

Figure 5A:
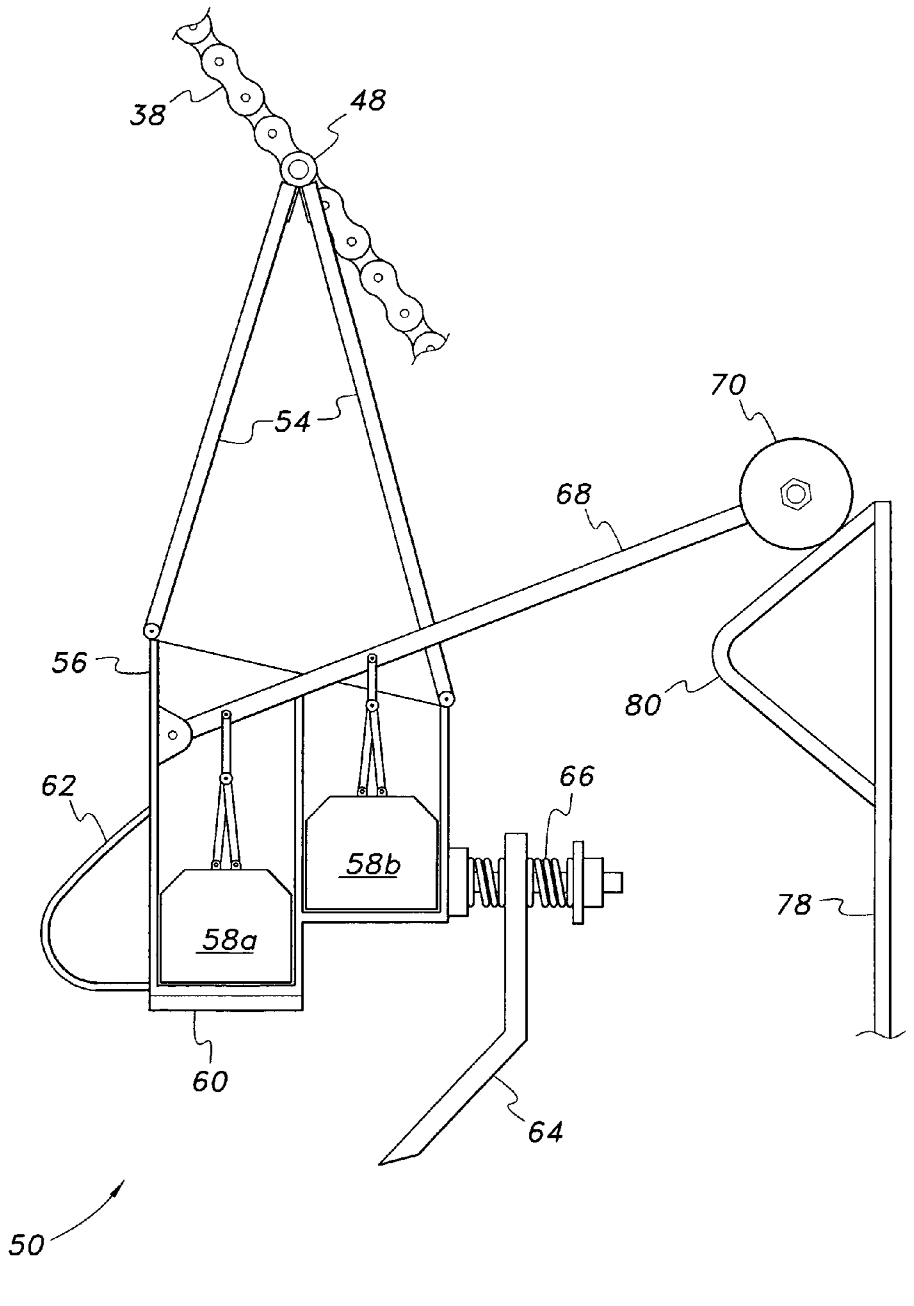
FIG. 5A is a detailed side elevation view of the initial contact position of one of the operating arm members of a machine for removing ferrous debris according to the present invention as it reaches the collection hopper.
Figure 5B:
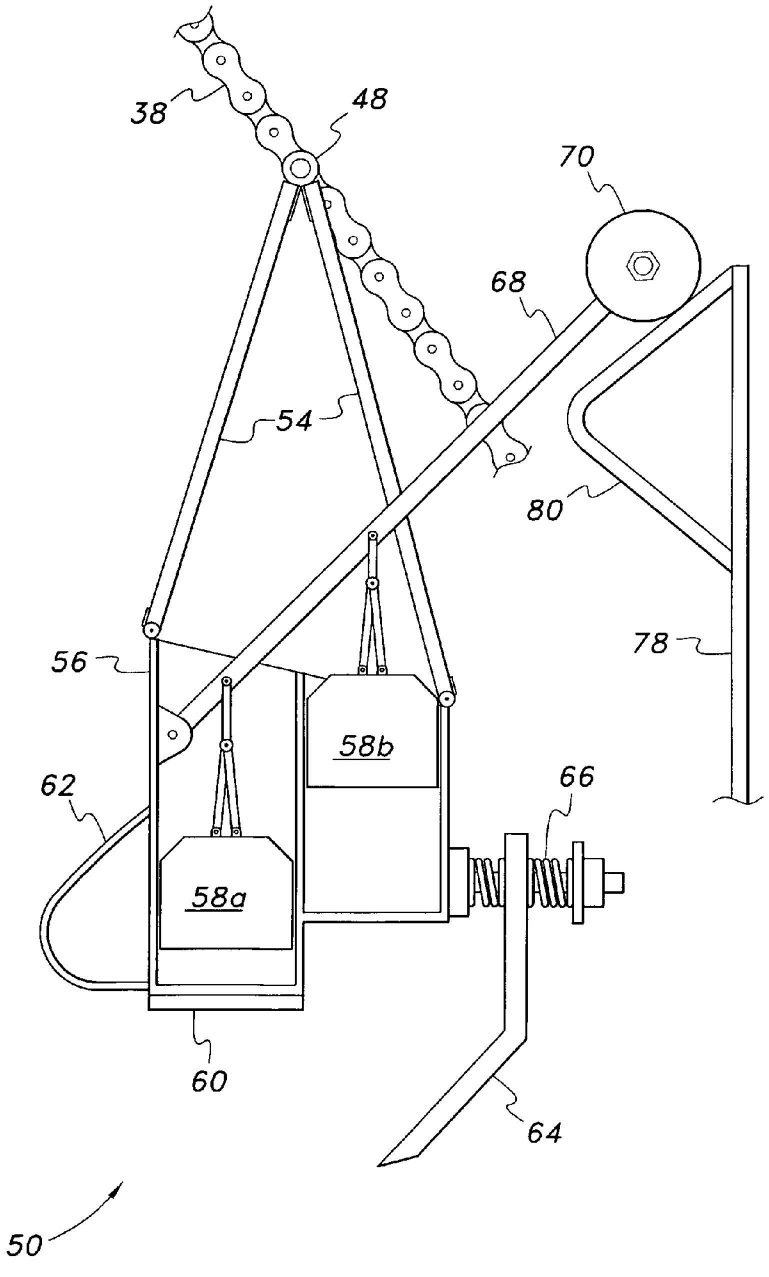
FIG. 5B is a detailed side elevation view of a more advanced position for the operating arm member of FIG. 5A, shown as the mechanism raises the magnets to release any ferrous debris into the collection hopper.
Figure 6:
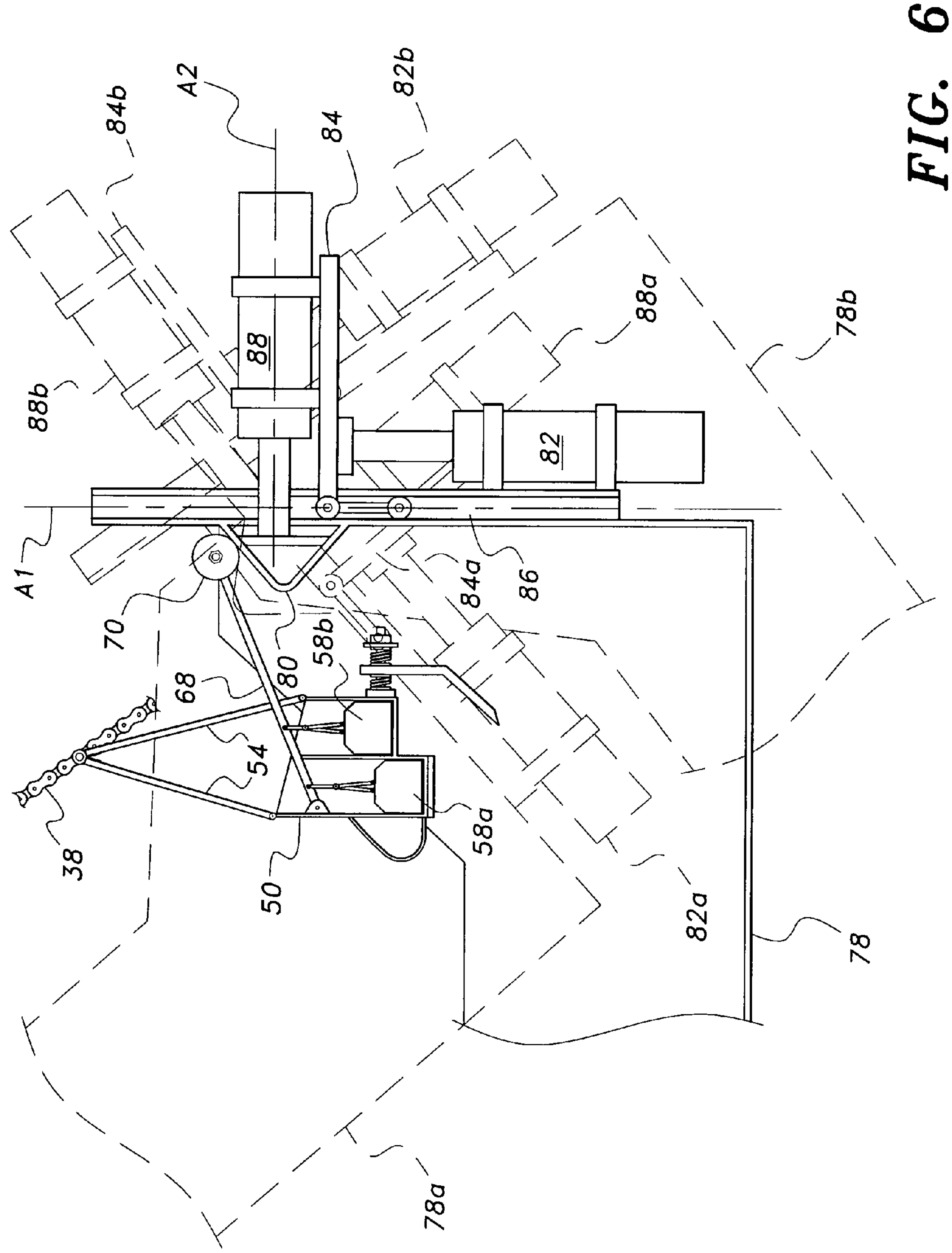
FIG. 6 is a schematic side elevation view showing the operation of the mechanism for positioning the release arm contact cam of the hopper according to the longitudinal slope of the machine for removing ferrous debris according to the present invention, to provide for accurate deposition of debris into the hopper.

FIGS. 5A and 5B illustrate the operation of the magnetic lifting arm 68 and magnet lifting cam of the ferrous metal collection hopper 78. The hopper 78 is located at the rearward portion 30 of the mechanism support frame 28, and includes a magnet lifting cam 80 along the upper portion of the rear wall thereof. While the cam 80 is shown immovably affixed to the upper rear wall of the hopper 78 in FIGS. 5A and 5B for clarity in the drawings, the cam 80 may be adjustably positioned relative to the hopper 78 in order to accommodate the swing of the magnetic operating arms 50 as the machine travels over sloped and/or uneven terrain. This adjustable cam mechanism is illustrated in FIG. 6 and discussed further below.

Magnetically attractive ferrous debris is picked up on the bottoms of the magnetic operating arm canisters 56 due to the immediately adjacent magnets 58*a*, 58*b* therein as the canisters are dragged across and through the upper few inches of topsoil. The ferrous debris is released from the bottoms of the canisters 56 when the magnets 58*a*, 58*b* are lifted from their working positions in the bottoms of the canisters. Accordingly, an automatic mechanism is provided to lift the magnets within the canisters, just as the magnetic operating arms 50 are positioned over the open top of the ferrous metal collection hopper 78.

FIG. 5A illustrates the normal positions of the two magnets 58*a*, 58*b* at the bottom of the canister 56 throughout most of the travel of the operating arm 50 as it is carried through its cycle by the conveyor system chains 38. In the case of FIG. 5, the canister 56 has just reached a position over the ferrous metal collection hopper 78 where any collected ferrous metal may be dumped into the hopper. The distal end 70 of the magnet lifting arm 68 has just contacted the upper side of the magnet lifting cam 80 in FIG. 5, but no lifting of the arm 68 has occurred in the position shown in FIG. 5A.

FIG. 5B shows the operating arm 50 at a slightly lower position relative to the hopper 78 and its magnet lifting cam 80 as the chain 38 carries the operating arm 50 about its conveyor circuit. In FIG. 5B, the relative downward motion of the operating arm 50 has resulted in the distal end 70 of the magnet lifting arm 68 being stopped by the magnet lifting cam 80. This results in the arm 78 rising as the roller on the end of the lifting arm 68 rolls over the cam 80. As the magnet lifting arm 78 rises, it lifts the magnets 58*a*, 58*b* away from the bottom of the canister 56, thereby reducing the magnetic flux at the bottom of the canister and releasing any ferrous metal debris gathered on the bottom of the canister 56 into the hopper 78. As the operating arm 50 continues its path defined by the conveyor chain 38, the distal end 70 of the magnet lifting arm 68 passes by the cam 80 and drops downwardly as the magnets 58*a*, 58*b* fall back to the bottom of the canister 56, thereby readying the operating arm 50 for the gathering of additional ferrous debris during the ground engaging portion of its path.

It will be seen that as the machine travels upwardly and downwardly over sloped surfaces, the operating arms 50 and 52 will swing forwardly and rearwardly relative to the fixed location of the hopper 78 during ground clearing operations. This will cause the relative location of the magnet lifting arm 68 to vary relative to the magnet lifting cam 80 to the point that the magnets may be raised too early in the cycle and release their collected debris outside of the hopper or to the point that the distal end 70 of the arm 68 misses the cam 80 entirely.

FIG. 6 illustrates the solution to this problem, in which the cam 80 is adjustably positioned at the upper rear of the hopper 78 by a pair of mutually orthogonal cam actuators. A first cam actuator 82, e.g., a hydraulic or pneumatic cylinder, etc., is affixed to the rear of the hopper 78 and drives a second cam actuator support 84 along a track 86 affixed to the back of the hopper and parallel to a first axis A1. A second cam actuator 88 is affixed to the support 84 normal to the first cam actuator 82, with the second cam actuator driving the magnet lift cam 80 along an axis A2 normal to the first axis A1. A conventional gravitational sensing and actuation system, e.g., mercury switches, pendulum and optical or magnetic sensors, etc., may be used to determine the angle of the trailer 14 and accordingly the hopper 78 mounted thereon.

FIG. 6 illustrates a series of alternative positions for the hopper 78 as the machine travels up and downhill. In FIG. 6, the magnetic operating arm 50 is always shown hanging straight down from its conveyor chain 38, while the upslope and downslope tilt of the machine results in the hopper being tilted upwardly or downwardly, as shown respectively by hopper positions 78*a* and 78*b* in broken lines.

When the machine is traveling up a slope, the hopper will be tilted somewhat forwardly, as shown by hopper position 78*a*. When this occurs, the relative position of the magnet lifting cam 80 will also change unless its position is adjusted. Accordingly, the first actuator, shown in position 82*a* for the upslope orientation in FIG. 6, has extended slightly to reposition the second cam actuator support and its second cam actuator, respectively, as shown at positions 84*a* and 88*a*. Simultaneously, the second cam actuator has retracted slightly to maintain the position of the magnet lifting cam 80 as fixed relative to the distal end 70 of the magnet lifting arm 68. Only the angular orientation of the cam 80 will change, and this results in a trivial change in the relative position of the hopper 78*a* and operating arm 50 as the magnets 58*a*, 58*b* are lifted.

When the machine travels downslope, the hopper is oriented generally as shown by hopper position 78*b* relative to the depending operating arm 50. When this occurs, the first cam actuator is repositioned slightly, as shown by first cam actuator position 82*b*. This repositions the second cam actuator support as shown at position 84*b*. Simultaneously, the second cam actuator, shown at position 88*b*, extends somewhat in order to maintain the position of the magnet lifting cam 80 relative to the distal end 70 of the magnet lifting arm 68, thereby assuring that all ferrous debris picked up by the magnets 58*a* and 58*b* in their canister 50 is dropped directly into the hopper 78, regardless of its slope.

Figure 7:
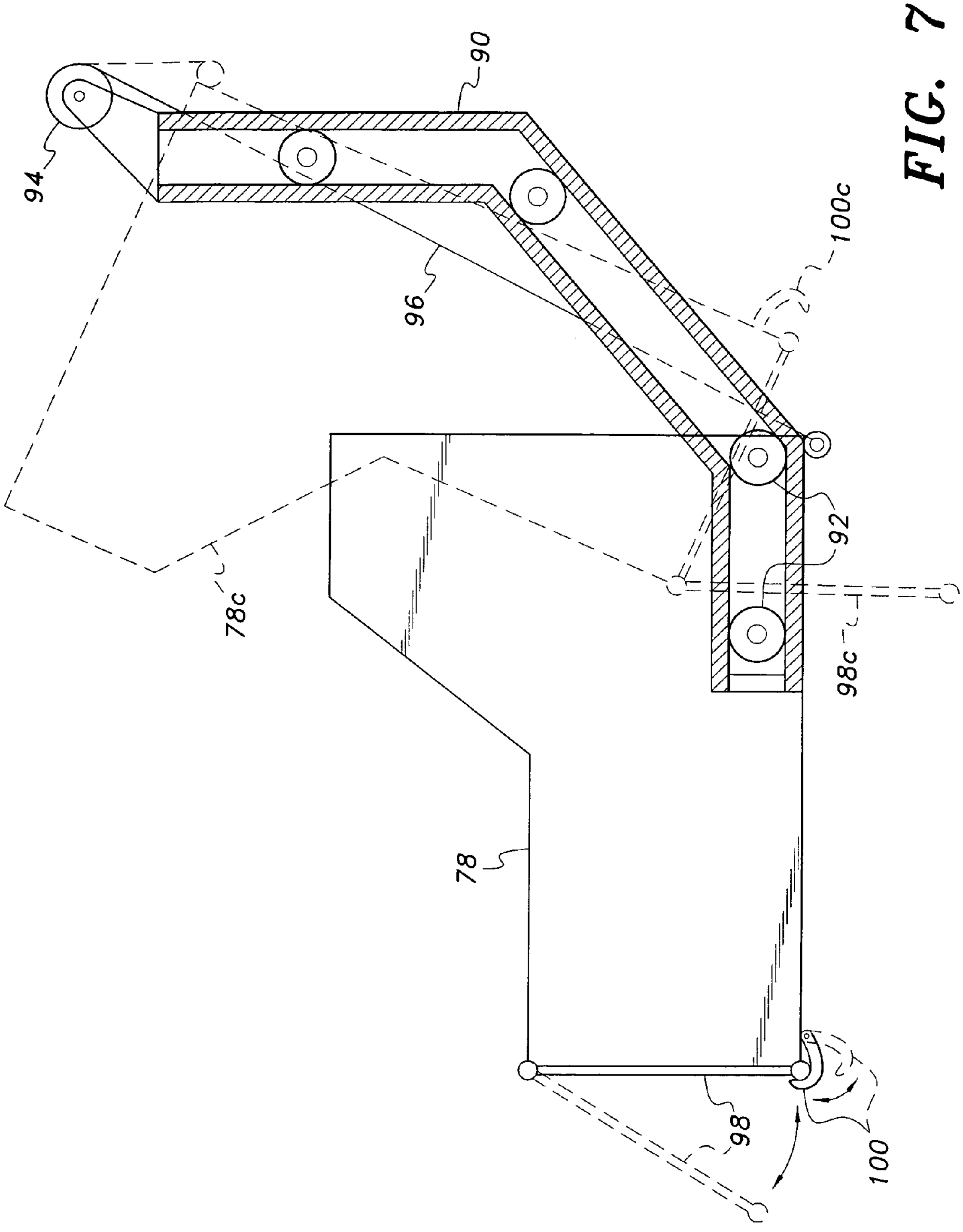
FIG. 7 is a side elevation view in section showing the repositioning of the hopper of a machine for removing ferrous debris according to the present invention during dump operations.

The collection hopper 78 must be emptied from time to time during operation of the present machine. Accordingly, the hopper 78 is movably mounted on the mechanism support frame 28 to allow it to be tilted for dumping. FIG. 7 illustrates this mechanism. The hopper 78 is mounted between laterally spaced apart first and second hopper tracks 90, which extend rearwardly from the back 30 of the mechanism support frame 28, generally as shown in FIGS. 1 and 2 of the drawings. The hopper 78 includes a series of laterally disposed rollers 92, which are captured within, and ride along, the two tracks 90. A hopper lift and tilt mechanism, comprising a winch 94 and cable 96, extends from the upper portion of the two tracks 90 and selectively draws the hopper upwardly along the tracks 90 when the contents of the hopper 78 are being emptied. The winch 94 may be hydraulically, electrically, or pneumatically operated as desired, with the operating principle preferably being the same as that used to drive other powered mechanisms of the present invention. The generally arcuate path of the tracks 90 results in the hopper being tilted to a forward end low orientation 78*c*, generally as shown in broken lines in FIG. 7.

As the hopper 78 is lifted upwardly along the tracks 90, its forward end with its dump door 98 is tilted downwardly. The dump door 98 is hinged along its top edge, with a remotely actuated latch 100 (e.g., a solenoid, a hydraulic cylinder, etc.) at the lower edge of the door 98 normally holding the door closed. When the hopper 78 is raised to its dumping position, shown as 78*c* in FIG. 7, the latch 100 may be opened, as shown as latch position 100*c* in broken lines in FIG. 7. When the hopper is raised and tilted to the position 78*c* and the latch 100 is released, the door 98 swings open, as shown in position 98*c*, thereby releasing the contents of the hopper.

The machine for removing ferrous debris is remotely or automatically operated, with the towing vehicle 12 towing the trailer portion 14 across the surface to be cleared. As the machine is towed over the surface being cleared, the conveyor system drags the operating arms across the surface, with the scarifying teeth loosening the uppermost layer of soil, and the magnets within the canisters picking up any loose or loosened ferrous debris. The articulation of the mechanism support frame relative to the chassis adjusts for uneven terrain and positions the bottoms of the operating arms and their scarifying teeth at a constant height relative to the underlying surface. The cyclic movement of the operating arms about the conveyor chain path moves the operating arms to the collection hopper, with the automated mechanism lifting the magnets to release their magnetic attraction through the bottoms of the canisters, thereby dropping any ferrous debris into the hopper. The position of the magnet lifting cam is automatically repositioned to adjust for any upslope or downslope operation of the machine.

When the field has been cleared and/or the hopper is full, the machine may be moved to a suitable dump area. Upon reaching the dump area, the hopper is translated upwardly and tilted to orient its dump door downwardly. Releasing the dump door latch or latches allows the door to swing open due to gravity, thereby allowing debris collected in the hopper to fall from the hopper. The machine is then ready for another clearing operation.

In conclusion, the machine for removing ferrous debris greatly improves the safety of persons working in the environment of gunnery, artillery, and other weapons firing ranges, where spent rounds must be gathered from time to time. The completely automated mechanism, with its automated and/or remotely controlled towing vehicle and automated ferrous debris gathering trailer, precludes any need for human operators to be near the vehicle or on the range where the vehicle is being used, during its operation. Thus, there is no risk of injury to anyone due to unexploded ordnance that may be triggered by the operation of the machine. Accordingly, the machine will prove to be invaluable for clearing firing ranges, and may also prove to be useful in antipersonnel mine clearing operations.

It is to be understood that the present invention is not limited to the embodiments described above, but encompasses any and all embodiments within the scope of the following claims.

We claim:

1. A machine for removing ferrous debris, comprising:
- a wheeled chassis;
- a mechanism support frame disposed upon the chassis;
- an operating arm conveyor system disposed upon the mechanism support frame;
- a plurality of operating arms pivotally depending from the operating arm conveyor system;
- a plurality of magnet canisters depending from the operating arms;
- a first magnet and a second magnet adjustably disposed within each of the magnet canisters;
- a magnet lifting arm pivotally secured to each of the magnet canisters and extending upwardly and rearwardly therefrom, each of the magnet lifting arms further having a distal cam contact end; and
- an intermediate link connecting each magnet to the corresponding magnet lifting arm.

2. The machine for removing ferrous debris according to claim 1, further including:
- at least one scarifier tooth extending from each of the operating arms;
- a ferrous metal collection hopper disposed upon the mechanism support frame; and
- a ferrous metal release mechanism, automatically and selectively releasing ferrous metal collected by each magnet into the hopper.

3. The machine for removing ferrous debris according to claim 1, further including an automated, remotely operated towing vehicle adapted for towing the wheeled chassis.

4. The machine for removing ferrous debris according to claim 1, wherein:
- the mechanism support frame has a forward end and a rearward end opposite the forward end, the rearward end being pivotally attached to the chassis; and
- at least one actuator extends between the forward end of the mechanism support frame and the chassis, selectively adjusting the mechanism support frame relative to the chassis.

5. The machine for removing ferrous debris according to claim 1, further including:

a ferrous metal collection hopper disposed upon the mechanism support frame;

a magnet lifting cam adjustably disposed upon the ferrous metal collection hopper;

a first cam actuator communicating with the magnet lifting cam, selectively adjusting the cam relative to a first axis; and a second cam actuator normal to the first cam actuator and communicating with the magnet lifting cam, selectively adjusting the cam relative to a second axis normal to the first axis.

6. The machine for removing ferrous debris according to claim 1, further including:

a first hopper track extending from the mechanism support frame;

a second hopper track extending from the mechanism support frame, laterally spaced from the first hopper track;

a plurality of laterally disposed rollers extending from the hopper, engaging each hopper track; and a hopper lift and tilt mechanism, selectively drawing the hopper along each hopper track for dumping the contents of the hopper.

7. A machine for removing ferrous debris, comprising:

a wheeled chassis;

a mechanism support frame disposed upon the chassis;

a first endless chain disposed upon the mechanism support frame;

a second endless chain disposed upon the mechanism support frame spaced laterally from the first endless chain;

a plurality of operating arm support crossmembers extending between the first chain and the second chain;

a plurality of operating arms pivotally depending from each of the operating arm support crossmembers, wherein at least some of the operating arms further comprise:

a plurality of suspension straps;

a magnet canister depending from the suspension straps;

a first magnet and a second magnet adjustably disposed within the magnet canister;

a magnet lifting arm pivotally secured to the magnet canister and extending upwardly and rearwardly therefrom, the magnet lifting arm further having a distal cam contact end; and an intermediate link connecting each magnet to the magnet lifting arm; and a drive motor communicating with the first chain and the second chain, the motor selectively driving each of the chains in synchronization with one another.

8. The machine for removing ferrous debris according to claim 7, further including:

at least one scarifier tooth extending from each of the operating arms;

at least one magnet disposed upon each of at least some of the operating arms;

a ferrous metal collection hopper; and a ferrous metal release mechanism, automatically and selectively releasing ferrous metal collected by each magnet into the hopper.

9. The machine for removing ferrous debris according to claim 7, further including an automated, remotely operated towing vehicle adapted for towing the wheeled chassis.

10. The machine for removing ferrous debris according to claim 7, wherein:

the mechanism support frame has a forward end and a rearward end opposite the forward end, the rearward end being pivotally attached to the chassis; and at least one actuator extends between the forward end of the mechanism support frame and the chassis, selectively adjusting the mechanism support frame relative to the chassis.

11. The machine for removing ferrous debris according to claim 7, further including:

a ferrous metal collection hopper disposed upon the mechanism support frame;

a magnet lifting cam adjustably disposed upon the hopper;

a first cam actuator communicating with the magnet lifting cam, selectively adjusting the cam relative to a first axis; and a second cam actuator normal to the first cam actuator and communicating with the magnet lifting cam, selectively adjusting the cam relative to a second axis normal to the first axis.

12. The machine for removing ferrous debris according to claim 7, further including:

a first hopper track extending from the mechanism support frame;

a second hopper track extending from the mechanism support frame, laterally spaced from the first hopper track;

a ferrous metal collection hopper disposed between the first hopper track and the second hopper track;

a plurality of laterally disposed rollers extending from the hopper, engaging each hopper track; and a hopper lift and tilt mechanism, selectively drawing the hopper along each hopper track for dumping the contents of the hopper.

13. A machine for removing ferrous debris, comprising:

an automated, remotely-operated towing vehicle; and a trailer adapted for towing behind the towing vehicle, the trailer having;

a wheeled chassis;

a mechanism support frame disposed upon the chassis;

a conveyor system disposed upon the mechanism support frame;

a plurality of operating arms depending from the conveyor system wherein at least some of the operating arms further comprise:

a plurality of suspension straps;

a magnet canister depending from the suspension straps;

a first magnet and a second magnet adjustably disposed within the magnet canister;

a magnet lifting arm pivotally secured to the magnet canister and extending upwardly and rearwardly therefrom, the magnet lifting arm further having a distal cam contact end; and an intermediate link connecting each magnet to the magnet lifting arm;

at least one scarifier tooth extending from each of the operating arms;

at least one magnet disposed upon each of at least some of the operating arms;

a ferrous metal collection hopper; and a ferrous metal release mechanism automatically and selectively releasing ferrous metal collected by each magnet into the hopper.

14. The machine for removing ferrous debris according to claim 13, wherein the conveyor system further comprises:

a first endless chain;

a second endless chain, spaced laterally from the first endless chain;

a plurality of operating arm support crossmembers extending between the first chain and the second chain; and a drive motor communicating with the first chain and the second chain, selectively driving each chain in synchronization with one another.

15. The machine for removing ferrous debris according to claim 13, wherein:

the mechanism support frame has a forward end and a rearward end opposite the forward end, the rearward end being pivotally attached to the chassis; and at least one actuator extends between the forward end of the mechanism support frame and the chassis, selectively adjusting the mechanism support frame relative to the chassis.

16. The machine for removing ferrous debris according to claim 13, further including:

a magnet lifting cam adjustably disposed upon the ferrous metal collection hopper;

a first cam actuator communicating with the magnet lifting cam, selectively adjusting the cam relative to a first axis; and a second cam actuator normal to the first cam actuator and communicating with the magnet lifting cam, selectively adjusting the cam relative to a second axis normal to the first axis.

17. The machine for removing ferrous debris according to claim 13, further including:

a first hopper track extending from the mechanism support frame;

a second hopper track extending from the mechanism support frame, laterally spaced from the first hopper track;

a plurality of laterally disposed rollers extending from the hopper, engaging each hopper track; and a hopper lift and tilt mechanism, selectively drawing the hopper along each hopper track for dumping the contents of the hopper.

* * * * *